July 26, 1955 N. A. WILKES 2,713,882
WING NUT ASSEMBLY WITH SPRING WIRE LOCKING MEANS
Filed Oct. 3, 1951
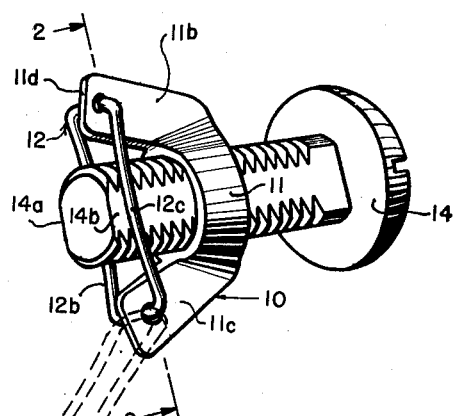
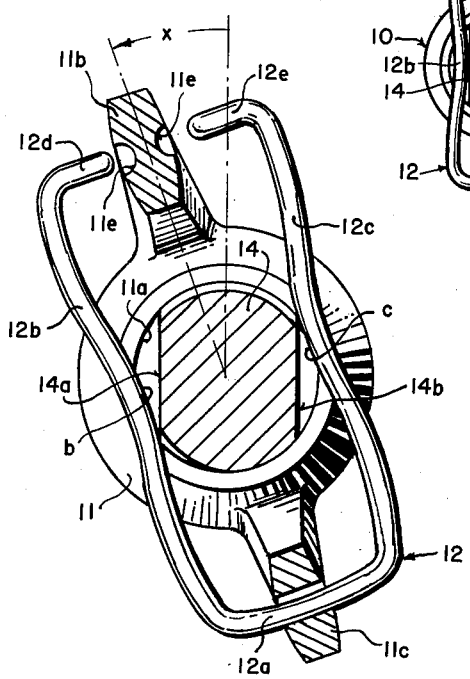
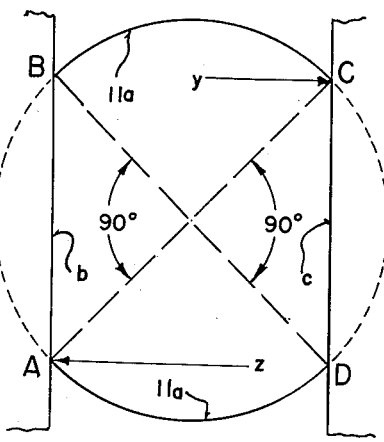
INVENTOR.
NORMAN A. WILKES
BY
Harry M. Saragovitz
Attorney United States Patent Office 2,713,882
Patented July 26, 1955

2,713,882

WING NUT ASSEMBLY WITH SPRING WIRE LOCKING MEANS

Norman A. Wilkes, Hyde Park, N. Y.

Application October 3, 1951, Serial No. 249,603

1 Claim. (Cl. 151—28)

(Granted under Title 35, U. S. Code (1952), sec. 266)

The invention described herein may be manufactured and used by or for the Government for governmental purposes, without the payment of any royalty thereon.

This invention relates to improvements in nuts, and more particularly to those of the type embodying some form of movable locking element or key effective when applied to hold the nut locked against rotation on a bolt or other threaded part.

An example of a nut in the general class to which the present invention relates is shown and described in Patent No. 2,435,012 issued January 27, 1948, to George R. Micuta. In this design, a semi-circular or substantially crescent-shaped locking element or key of spring steel or other material possessing substantial inherent resiliency, is carried by the nut and is capable of a limited pivotal or tilting movement with respect thereto. In applying the lock, the key or element is sprung or forced into the locking position whereat the central portion thereof becomes pressed or jammed into tight contact in the valley between adjacent threads of the associated bolt or other threaded part onto which the nut has been screwed. The nut is thus locked and rotation thereof is prevented against a torque of magnitude up to the shearing point whereat either the threads on the bolt are stripped or at least are considerably mutilated, or the locking element itself is distorted or broken. One or both of the parts so mutilated or damaged, must therefore be repaired or replaced.

With the foregoing in mind, it is one of the objects of the present invention to provide an improved nut of the character referred to wherein the locking element or key provides a positive and very effective lock between the nut and the associated bolt or other threaded part, but without causing or necessitating shearing, mutilation or other damage to any of the parts should there occur a torque greater than that against which the nut and its applied locking element are designed to hold.

Other objects and advantages will hereinafter appear.

For the purpose of illustrating the invention, an embodiment thereof is shown in the drawing, wherein:

Fig. 1 is an isometric view of a nut and associated locking element or key having structural and operating characteristics in accordance with the present invention;

Fig. 2 is a section taken on the line 2—2 in Fig. 1;

Fig. 3 is an enlarged, sectional view similar to Fig. 2 and illustrates the principle of operation; and Fig. 4 is a simplified diagrammatic view illustrative of the basic, geometrical aspect of the lock-nut structure, arrangement, and operating action.

In the specific embodiment of the invention disclosed herein the nut, designated generally by the reference numeral 10, is shown as being of the conventional wing type comprising a frustum-shaped body portion 11 provided centrally thereof with a circular, tapped opening 11a and with two wings 11b and 11c disposed, respectively, on diametrically-opposite sides of opening 11a.

Associated with nut 10 is a U-shaped locking element 12 pivotally connected to the nut for swinging movement to a locking position as shown in Figs. 1 and 2 and to a release position as shown in dash-line, in Fig. 1. For such purpose or operating action, the base portion 12a of element 12 extends through wing 11c and has a relatively loose fit with respect to the latter. Element 12 is preferably made of spring steel or other suitable material possessing substantial inherent resiliency.

An important characteristic of structure and arrangement in the improved design of lock nut embodying the present invention, is illustrated in Fig. 4. This resides in the fact that with element 12 in the locking position thereof as shown in Figs. 1 and 2, the spaced and substantially parallel inside faces or surfaces $b$ and $c$ of the respective side portions or legs 12b and 12c, are in respective planes each parallel to the other and to the longitudinal axis or center-line of opening 11a, the distance between these planes being substantially less than the diameter of opening 11a. Each of the surfaces $b$ and $c$, therefore, intersects the circular configuration of opening 11a on a chord. For simplicity of illustration and explanation, the faces or surfaces $b$ and $c$ have been shown in Fig. 4 as being perfectly flat and in parallel planes perpendicular to the paper. In such case, the surface $b$ intersects the circular configuration of opening 11a on chord AB, and the surface $c$ intersects such configuration on chord CD.

In using nut 10 the locking element 12 associated therewith is swung out or is otherwise moved to a release or unlock position such as the dash-line position shown in Fig. 1, after which the nut may be screwed onto a bolt or other threaded part 14. As more clearly shown in Fig. 3, the bolt or other threaded part 14 has on each of diametrically-opposite sides thereof a flat or substantially flat surface, such as those designated, respectively, by the reference numerals 14a and 14b. The surfaces 14a and 14b are parallel to each other and are spaced a distance equal to or slightly less than the distance between the inside surfaces $b$ and $c$ of element 12. With nut 10 in a position on bolt 14 about as shown in Fig. 1, element 12 is now swung clockwise from the dash-line, release or unlock position thereof to the full-line, locking position whereat element 12 embraces or locks over the bolt 14. The inside, substantially flat surfaces $b$ and $c$ now engage or are immediately adjacent and parallel to the respective and substantially flat surfaces 14a and 14b. As element 12 approaches the full-line, locking position the inwardly-directed ends 12d and 12e thereof engage the edge 11d of wing 11b, the thickness of this edge being greater than the distance between the adjacent, rounded tips of ends 12d and 12e. Element 12 is therefore sprung or spread slightly as it is forced clockwise through the remaining few degrees to the full-line, locking position shown in Figs. 1 and 2. As element 12 reaches this position, the rounded tips of the inwardly-directed ends 12d and 12e register with and enter complementary depressions 11e in wing 11b with a snap action. It is this interlocking of element 12 with nut 10 which holds the former in locking position, with the inside and substantially flat surfaces $b$ and $c$ either engaged with or disposed directly at and parallel to the respective, flat surfaces 14a and 14b of bolt 14.

With element 12 locked about bolt 14, there can be no rotary movement, in either direction, of the bolt or nut 10 with respect to each other. For example, nut 10 can be removed from bolt 14 or can be loosened even slightly from any tight or screwed-down position, only when a counter-clockwise torque applied to the nut becomes sufficient to spring or spread the locking element 12, as shown in Fig. 3. In such case, and considering bolt 14 as being always fixed, the total force effective at any time to oppose counter-clockwise movement of nut 10 and element 12 through an angle such as the angle $x$ in Fig. 3, equals the sum of two forces represented in Fig. 4 by the arrows $y$ and $z$, respectively. The resisting force $y$ is exerted or applied against surface c and mostly if not entirely at the edge or area C, whereas the resisting force z is exerted or applied against surface b and mostly if not entirely at the edge or area A. Of these two forces, each directed as shown to oppose counter-clockwise movement of nut 10 and the locking element 12 carried by the latter, the force z is the greater of the two and is so represented in Fig. 4. The relation of the magnitude of force z to that of force y corresponds to the factor obtained by dividing the distance from C to base portion 12a by the distance from A to base portion 12a. The same operating action would take place to oppose an opposite or clockwise movement of nut 10 with respect to bolt 14. In such case a resisting force corresponding to force y in Fig. 4 would be exerted or applied against surface b and mostly if not entirely at the edge or area B, and a resisting force corresponding to force z in Fig. 4 would be exerted or applied simultaneously against surface c and mostly if not entirely at the edge or area D. From the foregoing it will be seen that the resistance or locking action provided by element 12 to oppose rotation of nut 10 not only is two-directional but is two-fold because in either case both of the side portions or legs 12b and 12c of element 12 come into play simultaneously and function jointly to lock nut 10 on bolt 14.

For the purpose of rotating nut 10 in either direction on bolt 14, or to remove it from the bolt, there is applied to element 12 a counter-clockwise torque sufficient to spring or spread element 12 the slight amount required to break the hold or grip of the free end of element 12 on wing 11b of the nut. Element 12 is then swung clear of bolt 14, to a release position such as that shown in dash-line in Fig. 1.

From the foregoing explanation it will be seen that when the present improved lock nut is subjected to a torque greater than that against which it is designed to hold, there is no shearing, mutilation or other damage to the threads or to any other part, as in the various lock-nut designs proposed heretofore. On the contrary, in such case the locking element 12 is merely sprung or spread as shown in Fig. 3 and springs back or restores itself to normal position and shape when the angular position of nut 10 on bolt 14 again becomes such that surfaces b and c are parallel to surfaces 14a and 14b, or when element 12 is moved to the release position and clear of bolt 14.

The depth of the cut or other machine operation employed for the purpose of forming the flat surfaces 14a and 14b, is chosen to suit particular requirements or applications. For most purposes, the dimensional relation shown in Fig. 4 should be satisfactory, i. e., so that each of the chords AB and CD subtends an arc or angle of approximately ninety degrees. In some applications the locking effect will be sufficient if bolt 14 is made flat on only one side thereof. Other modifications such as in the size, shape and arrangement of the parts, are possible without departing from the spirit of the invention or the scope of the claim.

What is claimed is:

In combination, a threaded bolt and a similarly threaded nut therefor for engagement therewith, the shank of said bolt having a pair of oppositely-disposed flat surfaces along the threaded portion thereof, said nut being provided with first and second wings disposed respectively on diametrically-opposite sides thereof, said first wing having an opening therethrough, said second wing having complementary depressions on opposite sides thereof, and a substantially rectangularly-shaped locking element of open configuration having one side pivoted in said opening, the opposite side of said element having a split therein, the opposite borders of said split serving to engage said depressions to lock said spring element relative to said wing nut, the intermediate sides of said locking element being bent toward each other to engage said flat surfaces when said borders are engaged with the depressions in said second wing.

References Cited in the file of this patent

UNITED STATES PATENTS

| 766,895 | Payne | Aug. 9, 1904 |
| 793,432 | Geisel | June 27, 1905 |
| 900,202 | Pugh | Oct. 6, 1908 |
| 1,522,854 | Bellavance | Jan. 13, 1925 |
| 2,163,134 | Semion | June 20, 1939 |
| 2,402,693 | Summerbell | June 25, 1946 |

FOREIGN PATENTS

| 343,127 | Germany | Oct. 28, 1921 |
| 655,099 | France | Apr. 15, 1929 |